J. H. Sanford,
Edge Plane.
No. 102,048. Patented Apr. 19, 1870.
Fig. 1.        Fig. 2.
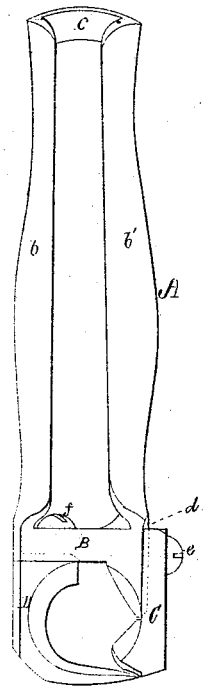 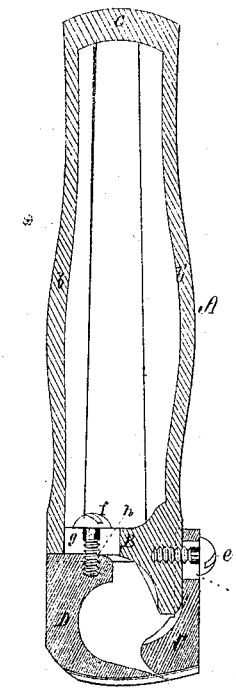
Fig. 3.
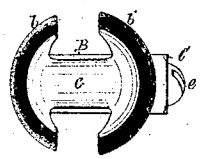
Witnesses        J. H. Sanford.
Jas Orne        by his attorney.
Seth Howe,        H. P. Hale

United States Patent Office.

JOSEPH HENRY SANFORD, OF NORTH BRIDGEWATER, MASSACHUSETTS, ASSIGNOR TO CHANDLER SPRAGUE, OF SAME PLACE.

Letters Patent No. 102,048, dated April 19, 1870.

IMPROVEMENT IN SHOEMAKERS' EDGE-PLANES.

The Schedule referred to in these Letters Patent and making part of the same

*To all persons to whom these presents may come:*

Be it known that I, JOSEPH HENRY SANFORD, of North Bridgewater, in the county of Plymouth and State of Massachusetts, have invented a new and useful Improvement in Shoemakers' Edge-Planes; and I do hereby declare the same to be fully described in the following specification, and represented in the accompanying drawings.

Of the said drawings—

Figure 1 denotes a side elevation of one of my improved sole edge-planes.

Figure 2, a central and longitudinal section of the same; and

Figure 3, a top view of the handle, to be hereinafter described.

My invention has reference to that class of edge-planes used by shoemakers in reducing, molding, and polishing the edges of the soles of boots and shoes, in which the molding and polishing edge or part of the implement is formed in two portions, viz: a cutter and its adjustable gauge or guard; and My invention consists in making the handle and the shank of the said tool in one piece of metal, whereby a better and more durable connection of the parts is effected than is attained by the methods heretofore adopted.

In the said drawings—

A denotes the handle of the implement, which is made hollow and has a long slot, *a*, made longitudinally through it.

The two leaves or parts *b b'* of the handle are united at their upper ends by a connector, *c*, the lower ends thereof being connected with a shank or bed-piece, B, having the shape as shown in figs. 1 and 2.

The said parts A and B are to be cast or formed of one piece of iron or other suitable metal or composition of metals.

From the under surface of the said shank or bed-piece an arm or projection, *d*, extends downward at a right angle, and has an adjustable edge-guard or gauge, C, attached to its front face by means of a set-screw, *e*, which extends through an elongated hole or slot, *i*, made through the gauge, and screws into the bed-piece, as seen in figs. 1 and 2, the said slot having such form, in order to allow the said gauge to be moved either toward or away from the cutter, as circumstances may require.

The said gauge C is maintained, while being adjusted in its proper path of movement, by means of a guide or tongue formed on the shank and its arm *d*, as shown in dotted lines in figs. 1 and 2, such guide fitting into and sliding within a correspondingly-shaped groove made in the gauge.

D is the curved cutter or knife, for reducing and molding the edge of a sole.

This cutter is attached to the shank or bed-piece by means of a set-screw, *f*, which extends through an elongated slot, *g*, formed in the said shank, and works into a female screw, *h*, made in the contiguous or upper face of the cutter, as shown in figs. 1 and 2.

The said cutter is so made and applied to the shank as to be readily applied thereto or removed therefrom as may be desirable either for being sharpened or otherwise.

It is also so connected with the said shank as to be adjustable with respect to the guard C, and while being moved either toward or away from the said guard, it is guided and supported by means of a guide or tongue made on the upper edge of the said knife, and sliding within a similar-shaped groove made in the bed-piece, as shown in dotted lines in fig. 1.

In using the said tool, a workman grasps it by the handle and applies the molding-edge against the edge of the sole to be reduced. By moving the same backward and forward over the edge of the sole, he will not only reduce the same to the shape required, but at the same time, or subsequently, polish or smooth it.

An edge-plane, constructed in my improved manner, possesses important advantages over edge-planes as ordinarily made, in which the shanks of the tools are inserted in wooden handles, as by my mode of construction, the shank of the tool cannot become loose or turn in its handle, but maintains a firm and unyielding connection therewith. Second, all the parts of my said plane being composed of metal, there is little or no liability of its getting out of order. Third, it is not only much more durable, but can be manufactured as cheaply as others in the market for a like purpose.

I do not claim making the molding and polishing-surface of an edge-plane in two parts; nor do I claim making either the cutter or its guard, or both, adjustable with respect to each other; nor the mode of fastening the cutter or the guard, as I am aware that such is not new.

I claim—

1. A sole-edge plane having its handle A and shank or part B formed or cast in one piece of metal, substantially as set forth.

2. A sole-edge plane having all of its several parts A B C D made of metal, formed and constructed as described, and applied together substantially as set forth.

Witnesses:                        J. H. SANFORD.
    CHANDLER SPRAGUE,
    CHARLES F. SYLVESTER.